United States Patent [19]

Aggarwal et al.

[11] Patent Number: 5,920,855
[45] Date of Patent: Jul. 6, 1999

[54] ON-LINE MINING OF ASSOCIATION RULES

[75] Inventors: Charu Chandra Aggarwal, Ossining; Philip Shi-Lung Yu, Chappaqua, both of N.Y.

[73] Assignee: International Business Machines Corporation, Armonk, N.Y.

[21] Appl. No.: 08/868,379

[22] Filed: Jun. 3, 1997

[51] Int. Cl.[6] ............................................. G06F 17/30
[52] U.S. Cl. ..................... 707/3; 707/1; 707/2; 707/6; 707/10
[58] Field of Search ............................. 707/2, 6, 1, 10, 707/3

[56] References Cited

U.S. PATENT DOCUMENTS

| 5,615,341 | 3/1997 | Agrawal et al. | 705/10 |
| 5,664,171 | 9/1997 | Agrawal et al. | 707/2 |
| 5,724,573 | 3/1998 | Agrawal et al. | 707/6 |
| 5,758,088 | 5/1998 | Bezaire et al. | 395/200.62 |
| 5,794,209 | 8/1998 | Agrawal et al. | 705/10 |
| 5,832,482 | 11/1998 | Yu et al. | 707/6 |
| 5,841,437 | 11/1998 | Fishkin et al. | 345/346 |

FOREIGN PATENT DOCUMENTS

| 0810807 | 12/1997 | Canada | H04Q 11/04 |
| 0855656 A2 | 7/1998 | European Pat. Off. | G06F 17/00 |

OTHER PUBLICATIONS

Agrawal, R., "Database Mining: A Performance Prespective", IEEE Transactions on Knowledge and Data Engineering, vol. 5, No. 6, Dec. 1993, pp. 914–925, Dec. 1993.

Hedberg, S., "Parallelism speeds data mining", IEEE Parallel & Distributed Technology, Winter 1995, pp. 3–6, Dec. 1995.

Houtsma et al., "Set–Oriented Mining for Association Rules in Relational Databases", 1995 IEEE, pp. 25–33, Dec. 1995.

Cheung et al., "Maintenance of Discovered Association Rules in Large Databases: An Incremental Updating Technique", 1996 IEEE, pp. 106–114, Dec. 1996.

Fayyad et al., The KDD Process for Extracting Usefull Knowledge from Volume of Data, ACM 0002–0782/96/1100, Jun. 1996.

Bergamo, L., "Silicon Graphics introduces MineSet", PR Newswire Apr. 16, 1996.

Moxon, B., "Defining Data Mining", DBMS Aug. 1996, v9 n9 ps11(3), Aug. 1996.

Edelstein, H., "Mining for gold", Informationweek, n627 pp. 53–70 Apr. 21, 1997.

Agrawal, R., "Mining Association Rules Between Sets of Items in Large Databases", Proceedings of the ACM SIGMOD Conference on Management of Data, Washington D.C., 1993, pp. 207–216.

Agrawal, R., "Fast Algorithms for Mining Association Rules", Proceedings of the 20th International Conference on Very Large Data Bases, 1994, pp. 487–499.

(List continued on next page.)

*Primary Examiner*—Wayne Amsbury
*Assistant Examiner*—Shahid Alam
*Attorney, Agent, or Firm*—Scully, Scott, Murphy & Presser; Kevin M. Jordan, Esq.

[57] ABSTRACT

A computer method of online mining of association rules by pre-processing data within the constraint of available memory. The required computational effort for performing online mining of association rules is reduced by a two-step procedure that involves first creating an adjacency lattice which pre-stores a number of large itemsets at a level of support dictated by available memory. The lattice structure is useful for both finding the itemsets quickly, by reducing the amount of disk I/O required to perform the analysis, and also using the itemsets in order to generate the rules. Once the adjacency lattice is obtained, the second (mining) step is further comprised of two phases. The first phase involves a search algorithm used to find the corresponding itemsets at user specified levels of minimum support. The second phase involves using those itemsets to generate association rules at the user specified level of minimum confidence.

16 Claims, 7 Drawing Sheets

OTHER PUBLICATIONS

Srikant, R. "Mining Generalized Association Rules", Proceedings of the 21st International Conference on Very Large Data Bases, 1995, pp. 407–419.

Srikant, R., "Mining Quantiative Association Rules in Large Relational Tables", Proceedings of the 1996 ACM SIGMOD Conference on Management of Data, Montreal Canada (1996), pp. 1–12.

Ahuja, R.K., "Network Flows: Theory, Algorithms and Applications" Prentice Hall, EngleWood Cliffs, New Jersey, pp. 33–38, 73–77.

| ITEMSET | SUPPORT |
|---------|---------|
| A | 1% |
| B | 2% |
| C | 2% |
| D | 1% |
| AB | 0.5% |
| AC | 0.7% |
| BD | 0.6% |
| BC | 0.4% |
| ABC | 0.3% |

ON-LINE MINING OF ASSOCIATION RULES

BACKGROUND OF THE INVENTION

1. Field of the Invention

The present invention relates generally to online searching for data dependencies in large databases and more particularly to an online method of data mining of data items in a large database.

2. Discussion of the Prior Art

Data mining, also known as knowledge discovery in databases, has been recognized as a new area for database research. The volume of data stored in electronic format has increased dramatically over the past two decades. The increase in use of electronic data gathering devices such as point-of-sale or remote sensing devices has contributed to this explosion of available data. Data storage is becoming easier and more attractive to the business community as the availability of large amounts of computing power and data storage resources are being made available at increasingly reduced costs.

With much attention focused on the accumulation of data, there arose a complimentary need to focus on how this valuable resource could be utilized. Businesses soon recognized that valuable insights could be gleaned by decision-makers who could make use of the stored data. By using data from bar code companies, or sales data from catalog companies, it is possible to gain valuable information about customer buying behavior. The derived information might be used, for example, by retailers in deciding which items to shelve in a supermarket, or for designing a well targeted marketing program, among others. Numerous meaningful insights can be unearthed from the data utilizing proper analysis techniques. In the most general sense, data mining is concerned with the analysis of data and the use of software techniques for finding patterns and regularities in sets of data. The objective of data mining is to source out discernible patterns and trends in data and infer association rules from these patterns.

Data mining technologies are characterized by intensive computations on large volumes of data. Large databases are definable as consisting of a million records or more. In a typical application, end users will test association rules such as; "75% of customers who buy Coke also buy corn chips", where 75% refers to the rule's confidence factor. The support of the rule is the percentage of transactions that contain both Coke and corn chips.

To date the prior art has not addressed the issue of online mining but has instead focused on an itemset approach. A significant drawback of the itemset approach is that as the user tests the database for association rules at differing values of support and confidence, multiple passes have to be made over the database, which could be of the order of Gigabytes. For very large databases, this may involve a considerable amount of I/O and in some situations, it may lead to unacceptable response times for online queries. A user must make multiple queries on a database because it is difficult to guess apriori, how many rules might satisfy a given level of support and confidence. Typically one may be interested in only a few rules. This makes the problem all the more difficult, since a user may need to run the query multiple times in order to find appropriate levels of minimum support and minimum confidence in order to mine the rules. In other words, the problem of mining association rules may require considerable manual parameter tuning by repeated queries, before useful business information can be gleaned from the transaction database. The processing methods of mining described heretofore are therefore unsuitable to repeated online queries as a result of the extensive disk I/O or computation leading to unacceptable response times. The need for expanding the capabilities of data mining to the internet requires dynamic online methods rather than the batch oriented method of the itemset approach. It is therefore a primary object of the invention to provide a computationally efficient method for making online queries on a database to evaluate the strength of association rules utilizing user supplied levels of support and confidence as predictors.

SUMMARY OF THE INVENTION

The present invention is directed to a method for efficiently performing online mining of association rules. In order to carry out the object of the present invention, there is disclosed, a method for preprocessing the raw data by organizing it in the form of an adjacency lattice, followed by a rule generation step. By effectively pre-processing the data into a lattice structure it is placed in a form suitable to answer repeated online queries with practically instantaneous response times. Once created, the lattice structure obviates the need to make multiple passes over the database. The lattice creates significant performance advantages over previous techniques. The lattice (pre-processed data) is stored in such a way that online processing may be done by applying a graph theoretic search algorithm whose complexity is proportional to the size of the output. This results in an online algorithm which is practically instantaneous in terms of response time, minimizing excessive amounts of I/O or computation.

The present invention is extendable by classifying the raw transactional data hierarchically or along different dimensions.

DESCRIPTION OF THE PREFERRED EMBODIMENTS

The present invention is directed to a method for online data mining. Traditional database queries contrasts with data mining typified by simple questions such as "what were the sales of orange juice in January 1995 for the Boston area?". Data mining, by contrast, attempts to source out discernible patterns and trends in the data and infers rules from these patterns. With these rules the user is then able to support, review and examine decisions in some related business or scientific area. Consider, for example, a supermarket with a large collection of items. Typical business decisions associated with the operation concern what to put on sale, how to design coupons, and how to place merchandise on shelves in order to maximize profit, etc. Analysis of past transaction data is a commonly used approach in order to improve the quality of such decisions. Modern technology has made it possible to store the so called basket data that stores items purchased on a per-transaction basis. Organizations collect massive amounts of such data. The problem becomes one of "mining" a large collection of basket data type transactions for association rules between sets of items with some minimum specified confidence. Given a set of transactions, where each transaction is a set of items, an association rule is an expression of the form X=>Y, where X and Y are sets of items. An example of an association rule is: 30% of transactions that contain beer also contain diapers; 2% of all transactions contain both of these items". Here 30% is called the confidence of the rule, and 2% the support of the rule.

Another example of such an association rule is the statement that 90% of customer transactions that purchase bread and butter also purchase milk. The antecedent of this rule, X, consists of bread and butter and the consequent, Y, consists of milk alone. Ninety percent is the confidence factor of the rule. It may be desirable, for instance to find all rules that have "bagels" in the antecedent which may help determine what products (the consequent) may be impacted if the store discontinues selling bagels.

The present method presumes the existence of a large database containing individual records, which could represent, for example, individual retail sales transactions T. Each sales transaction, T, in the database would be comprised of one or more selected store items from the set of all store items I, where I={i1, i2, . . . , im}.

For example, a typical database for a supermarket might consist of the following point-of-sales transactions where each transaction, T, consists of a set of purchasable store items, an itemset, from the set I.

| Transaction (1) = milk, bread, cheese = | itemset 1 |
| Transaction (2) = milk = | itemset 2 |
| Transaction (3) = soap, bread = | itemset 3 |
| : : : | |
| : : : | |
| Transaction (10000) = cookies, juice = | itemset 10000 |

For each transaction, T, each item, I, has a (zero or one) designation for that transaction, depending upon whether or not that item was purchased.

Given a set of transactions, D, the problem of mining association rules is to find all rules that have support and confidence greater than the user-specified minimum support (minsupport) and minimum confidence (minconfidence). Generally, the support of a rule X=>Y is the percentage of customer transactions, or tuples in a generalized database, which contain both X and Y itemsets. In more formal mathematical terminology, the rule X=>Y has support s in the transaction set D if s % of transactions in D contain X union Y, X V Y. The confidence of a rule X=>Y is defined as the percentage of transactions that contain X also contain Y. Or more formally, the rule X=>Y has confidence c in the transaction set D if c % of transactions in D contain X also contain Y. Thus if a rule has 90% confidence then it means that 90% of the transactions containing X also contain Y.

As previously stated, an association rule is an expression of the form X=>Y. For example if the itemsets X and Y were defined to be X=[milk & cheese & butter]

Y=[eggs & ham] respectively

The rule may be interpreted as:

RULE: X=>Y, implies that given the occurrence of milk, cheese and butter in a transaction, what is the likelihood of eggs and ham appearing in that same transaction to within some defined support and confidence level.

The support and confidence of the rule collectively define the strength of the rule. There are a number of ways in which a user may pose a rule to such a system in order to test its strength. A non-inclusive yet representative list of the kinds of online queries that such a system can support include;

(1) Find all association rules above a certain level of minsupport and minconfidence.

(2) At a certain level of minsupport and minconfidence, find all association rules that have the set of items X in the antecedent.

(3) At a certain level of minsupport and minconfidence, find all association rules that have the set of items Y in the consequent.

(4) At a certain level of minsupport and minconfidence, find all association rules that have the set of items Y either in the antecedent or consequent or distributed between the antecedent and consequent.

(5) Find the number of association 4; rules/itemsets in any of the cases (1), (2), (3), (4) above.

(6) At what level of minsupport do exactly k itemsets exist containing the set of items Z.

Figure 1:
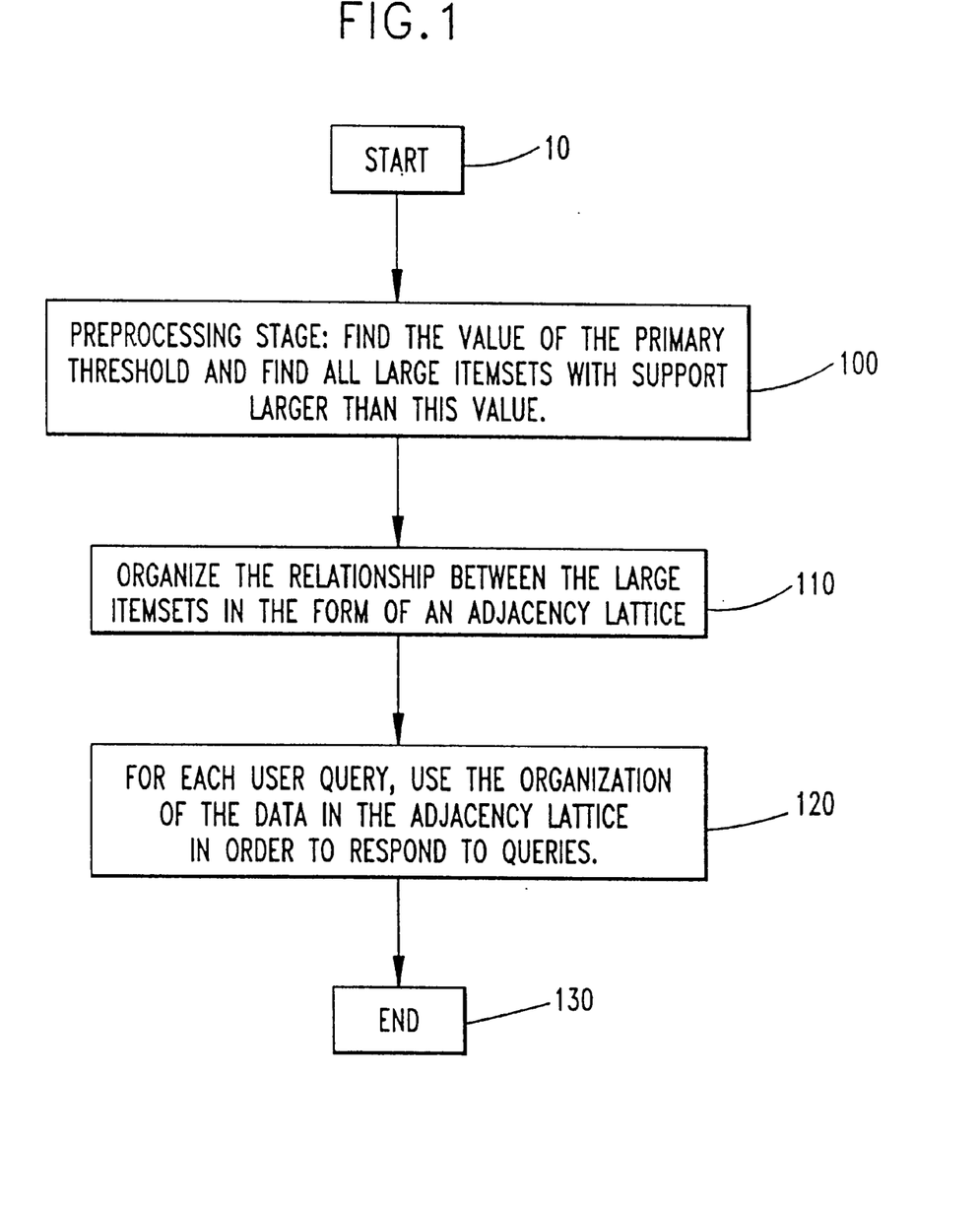
FIG. 1 is an overall description of the entire process. It includes both the pre-processing as well as the online rule generation stages.
Figure 7A:
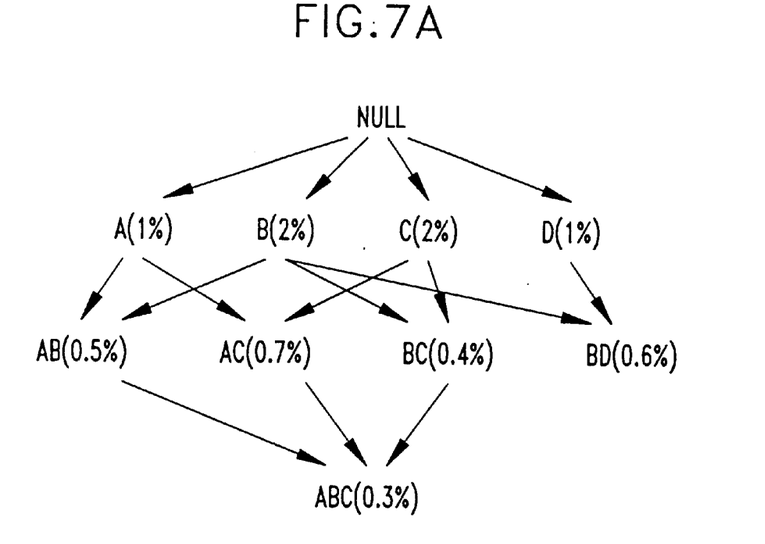
FIG. 7 is a description of the construction of the adjacency lattice.
Figure 7B:
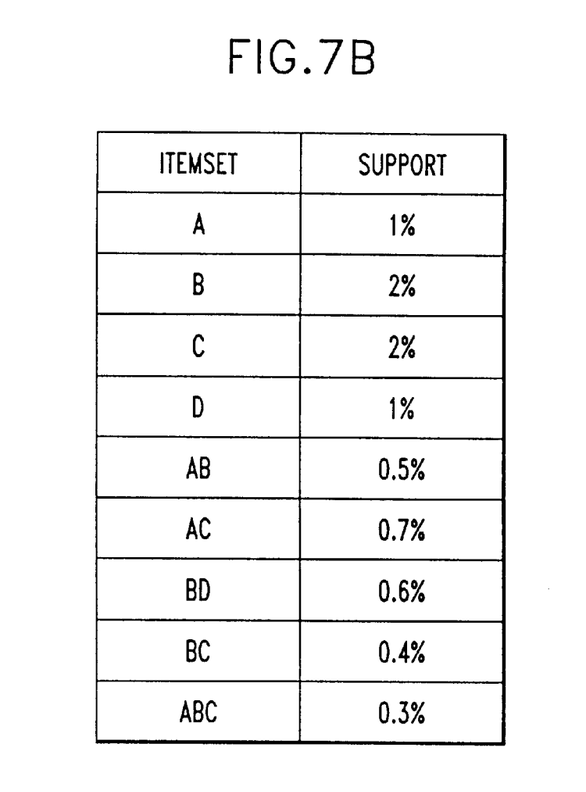

Discovering association rules in the present method involves first constructing an adjacency lattice, see step 110 of FIG. 1 and FIG. 7. The construction of the lattice is crucial to performing effective online data mining. The key advantage resides in minimizing the amount of disk I/O required to respond to user queries.

The adjacency lattice, as used in the present method, is a graphical analogue to represent the functional relationships between the various large itemsets stored in a memory resident data structure. Where large itemsets are defined as those itemsets having a support value larger than the specified minimum support value (minsupport).

In mathematical terms, the adjacency lattice may be described as an acyclic directed graph with a vertex, v(I), representative of each primary itemset which satisfies both the minimum support and computer memory constraints. Stored along with each vertex is an associated value of support, defined by s(I). Directed edges are extended from one vertex to another whenever the two vertices are distinct from one another by only a single item. Such vertexes (itemsets) are said to be adjacent. The specific relationship between such adjacent vertices is that of parent/child. Specifically, an itemset X is said to be a parent of the itemset Y if Y can be obtained from X by adding a single item to the set X. For any pair of vertices corresponding to itemsets X and Y, a directed edge exists from v(X) to v(Y) if and only if X is a parent of Y.

Figure 2:
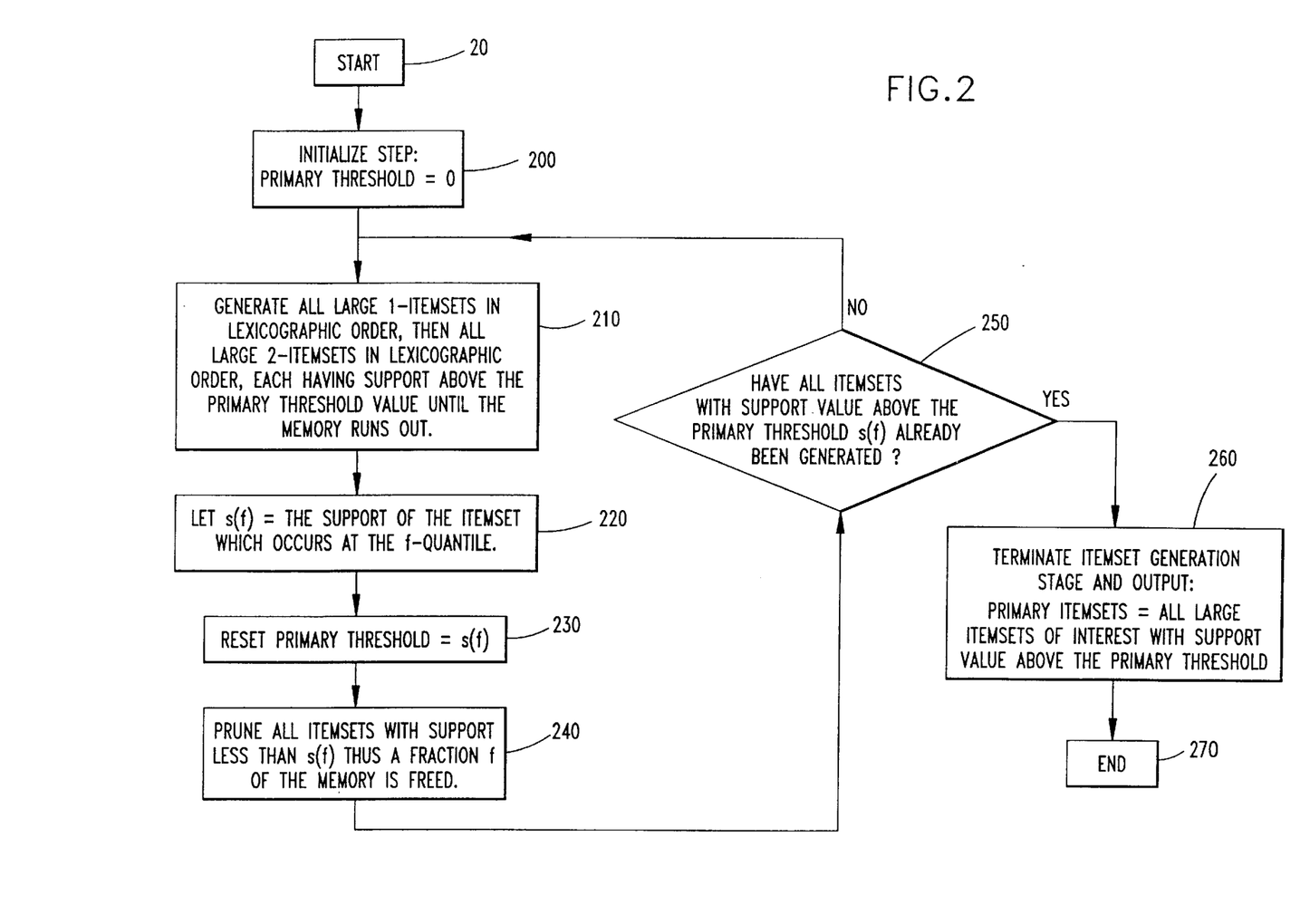
FIG. 2 is a description of the preprocessing stage of the algorithm in which all the primary itemsets are generated. It can be considered an expansion of step 100 in FIG. 1.

FIG. 2 is the detailed flowchart of the preprocessing stage of the algorithm illustrated in FIG. 1 as element 100. The process steps involve fixing the lower bound of minimum support, the primary threshold, to zero and increasing its value in each iteration until all itemsets of interest fit into the available memory. Step 20 of FIG. 2 is the point of entry into the preprocessing routine. Step 200 represents the software to implement the process step of intentionally underestimating the primary threshold value to zero. Step 210, which is the next step in the process following step 200, represents the software to implement the process step of generating all k-itemsets at the primary threshold value level of support, initially zero, then all 2-itemsets, and so on, until the memory space runs out. An itemset is defined as a kth-itemset, where k=1,2,3, . . . m, if it contains exactly k items. Step 220 represents the software to implement the process step of setting s(f) to the support of the itemset which occurs at the f-quantile. Step 230, the step immediately following step 220, resets the primary threshold to s(f). Step 240, the step immediately following step 230, represents the software which prunes those itemsets with support less than the primary threshold, s(f). Step 250, which is the step directly following step 240, represents the software to implement the process step of determining whether all itemsets with support value above the primary threshold, s(f), have already been generated. If there are remaining large itemsets to be generated, due to insufficient memory based on the current primary threshold, then the process steps described at steps 210–240 will be repeated until all remaining large itemsets are generated.

To clarify the above process, the process steps of FIG. 2 are explained with reference to Table I where itemsets {A–F} represent those k-itemsets which fit into the available memory as a result of initially setting the primary threshold value to zero, corresponding to step 210.

TABLE I

| ITEMSET | ASSOCIATED SUPPORT |
|---------|--------------------|
| A | 20% |
| B | 16% |
| C | 11% |
| D | 9% |
| E | 7% |
| F | 4% |

Assuming the f-quantile was input at a value of 33%, let s(f) equal the support of the itemset, itemset D, which occurs at the f-quantile level, s(f)=9%. Reset the primary threshold to s(f). Any itemsets in Table I with associated support less than the new primary threshold value, 9%, will be pruned. This translates into itemsets E and F being deleted from the list, see Table II.

TABLE II

| ITEMSET | SUPPORT |
|---------|---------|
| A | 20% |
| B | 16% |
| C | 11% |
| D | 9% |

This process is repeated until all itemsets with support value above the primary threshold, s(f), have been generated.

Figure 3:
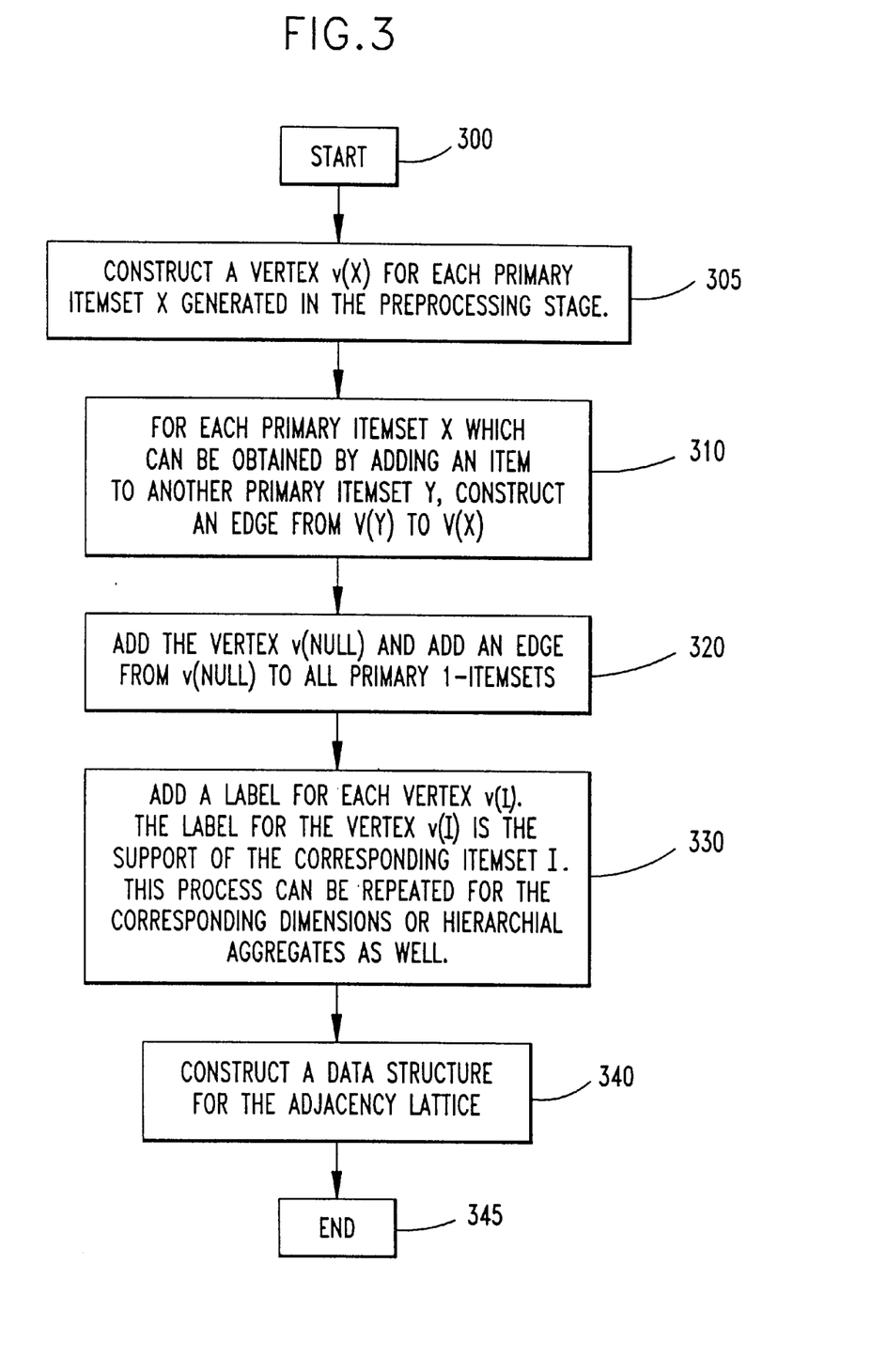
FIG. 3 is a description of the preprocessing stage of the algorithm in which the relationships between these primary itemsets are organized. It can be considered an expansion of step 110 of FIG. 1.

FIG. 3 is the detailed flowchart of the organizational relationship between the large itemsets in the form of an adjacency lattice, described in FIG. 1 as step 110. As previously stated, the lattice is merely a mathematical analog of an internal data structure constructed in the present invention. The lattice more clearly illustrates the relationships between the large itemsets in the data structure. The adjacency lattice is built by constructing a graph with a vertex v(I) for each primary itemset I. Each vertex has a label, s(I), corresponding to its value of support.

At step 300, a vertex for each primary itemset X is generated. If a primary itemset Y can be extended by adding a single item, an edge is added from vertex Y, v(Y) to v(X) in step 310. Each vertex, as it is added, is labeled with its corresponding support value. Step 320, which is the step directly following step 310, represents the software to implement the process step of extending a vertex, called v(NULL), to all primary itemsets generated by the process step defined by step 300.

Figure 4:
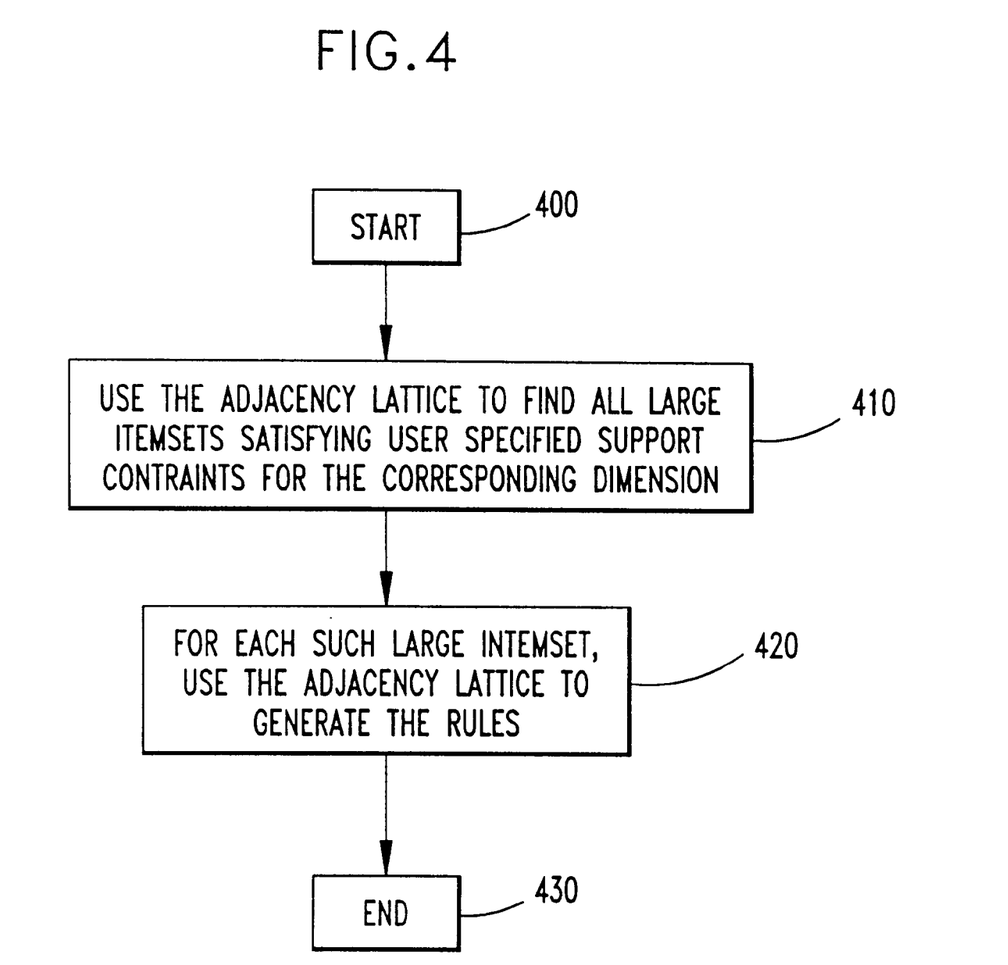
FIG. 4 is an overall description of how an online request from a user is handled. It can be considered an expansion of step 120 of FIG. 1.

FIG. 4 is a high level flowchart of how online requests from users are processed by the present invention. This two stage process is illustrated in steps 410 and 420 of FIG. 4. The respective steps generally describes a process which differs significantly from the prior art. The details of these respective steps are described by FIG.5 and FIG.6, respectively.

Figure 5:
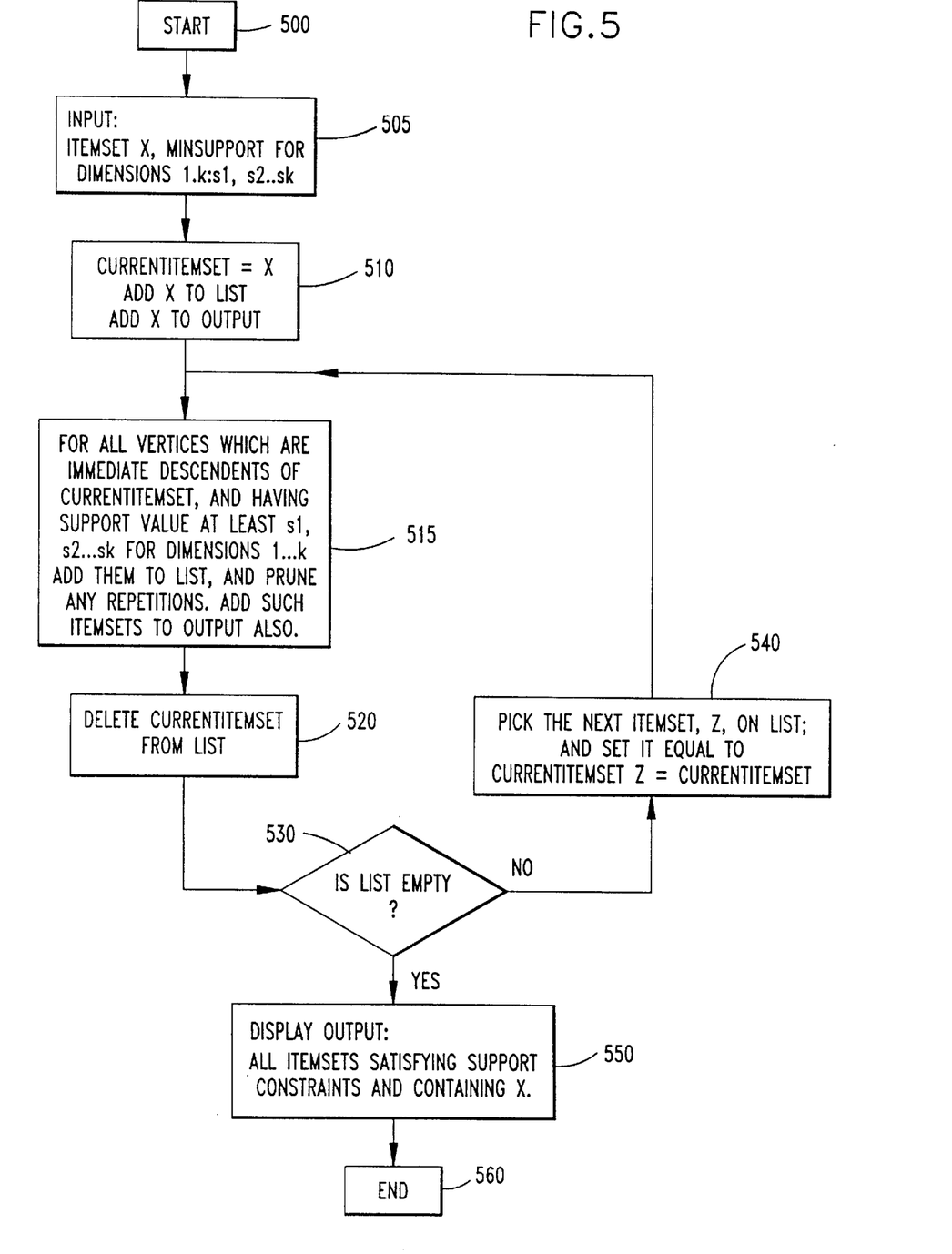
FIG. 5 is a description of how large itemsets are generated. It can be considered an expansion of step 410 of FIG. 4.

FIG. 5 is a detailed flowchart of how large itemsets are generated, illustrated in FIG. 4 as step 410. Step 510 represents the software to implement the process step of initialization which includes equating the input, itemset X, to Currentitemset and adding itemset X to both lists, LIST and OUTPUT. LIST represents a list of those vertices in the constructed adjacency lattice that satisfy the defined support value and have yet to be evaluated by the process step represented by step 510. OUTPUT is a collection or list of all of the large itemsets in the lattice which that satisfy the user defined support value and contain the input itemset X. Step 510, which is the step directly following step 500, and represents the software to implement the process step of locating and evaluating the direct descendants of X in the adjacency lattice to determine which descendants satisfy the user specified support level. Each qualifying direct descendent is added to both LIST and OUTPUT. Step 520, which is the step directly following step 510 and represents the software to implement the process step of deleting the itemset from which qualifying descendants were found in the previous step. Step 530, which is the step directly following step 520, represents the software to implement the process step of determining whether the procedure is to be terminated. The process will terminate when there are no additional vertices in the adjacency lattice to be explored. When the condition for termination is satisfied a branch to step 550 is taken. Step 550, represents the software to implement the process step of displaying to a user, the output of the process steps of FIG. 5, OUTPUT list, which consists of all large itemsets in the lattice that contain input itemset X and also satisfy the defined level of support. In the event there are additional descendants of X in LIST to be analyzed, a branch from step 530 to step 540 is taken. Step 540 represents the software to implement the process step of selecting from LIST, the next itemset in the adjacency lattice, Z, to be evaluated for qualifying descendants.

Figure 6:
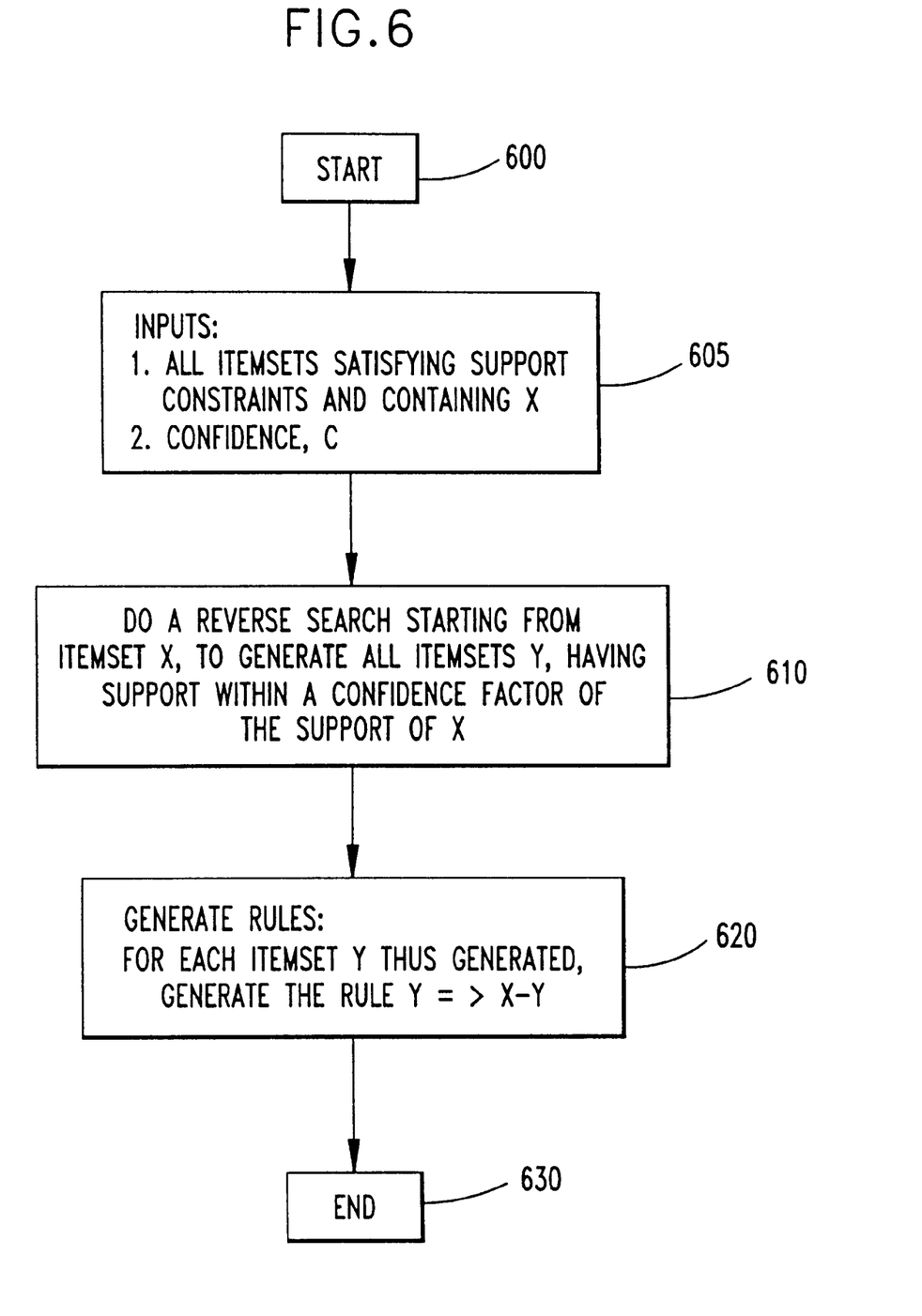
FIG. 6 is a description of how the large itemsets are used in order to generate rules efficiently by using the adjacency lattice. It can be considered an expansion of step 420 of FIG. 4.

FIG. 6 is the detailed flowchart of how the large itemsets, located by the process steps of FIG. 5, are used to generate the rules. Rules are generated in accordance with some user level of confidence, (mincofidence). The process of generating rules requires that a reverse search be performed in the adjacency lattice starting at itemset X. Step 610 of FIG. 6 represents the software to implement the process step of performing a reverse search in the adjacency lattice, starting from itemset X, in order to generate all itemsets whose support is within the required user specified confidence level, c. The method of reverse search is known in the prior art and is discussed in [AOMreverse].

Step 620 represents the software for performing the process step of generating an association rule for each itemset located by the process step of step 610. For each itemset, Y, located by the process step of step 610, step 620 generates the following rule, Y=>X-Y.

The method of the present invention overcomes the weaknesses of the prior art by establishing an intuitive framework for performing online mining of association rules. The online time required to mine rules is made acceptable through the novelty of preprocessing the raw data by organizing itemsets along with support information in a way that depends only on the number of relevant large itemsets rather than the number of itemsets prestored.

We claim:

1. A computer performed process of online mining of a large database having a plurality of records, and each record has a plurality of items for providing association rules comprising the steps of:

inputting to the computer, data including user queries, a minimum support level, a minimum confidence level, a f-quantile level; and generating large itemsets based on a predefined criteria constrained by available computer memory; and storing said large itemsets; and constructing in memory a data structure, including large itemsets, an associated support value for each itemset, and adjacency information relating said large itemsets; and selecting those large itemsets from said data structure that satisfy said user queries; and generating association rules from those large itemsets that satisfy said user queries at a minimum support and a minimum confidence; and displaying to a user said association rules; and interactively modifying said user query to further define said association rules.

2. A method according to claim 1 where the step of generating large itemsets is based on said minimum support level.

3. A method according to claim 2 where finding said minimum support level further comprises:

generating all large k-itemsets in lexicographic order at some underestimate of said user required support level until the available memory is fully utilized; and resetting said underestimated support level upward to a value defined by said f-quantile value; and pruning all k-itemsets whose associated support value is less than said underestimated support value; and continuing this process until a level of support is achieved that allows all generated k-itemsets to be stored within the available memory of the system.

4. A method according to claim 2 wherein the step of generating large itemsets further includes generating large itemsets with a plurality of dimensions.

5. A method according to claim 2 wherein the step of generating large itemsets further includes a hierarchical structure for said large itemsets.

6. A method according to claim 2 wherein the step of generating large itemsets further includes both a plurality of dimensions and a hierarchical structure for said large itemsets.

7. A method according to claim 1 where the step of generating large itemsets is based on the largest number of itemsets desired given available computer memory.

8. A method according to claim 1, wherein the step of prestoring adjacency information further includes the steps of:

storing all subsets of large itemsets; and storing pairs of large itemsets such that one itemset can be obtained from another by removing exactly one item.

9. A computer program device readable by a machine, tangibly embodying a program of instructions executable by a machine to perform method steps for computer performed process of online mining of a large database having a plurality of records, and each record having a plurality of items for providing association rules comprising the steps of:

inputting to the computer, data including user queries, a minimum support level, a minimum confidence level, a f-quantile level;

generating large itemsets based on a predefined criteria constrained by available computer memory and storing said large itemsets;

constructing in memory a data structure, including large itemsets, an associated support value for each itemset, and adjacency information relating said large itemsets;

selecting those large itemsets from said data structure that satisfy said user queries;

generating association rules from those large itemsets that satisfy said user queries at a minimum support and a minimum confidence; displaying to a user said association rules; and interactively modifying said user query to further define said association rules.

10. The computer program device according to claim 9 where the step of generating large itemsets is based on said minimum support level.

11. The computer program device according to claim 10 where finding said minimum support level further comprises:

generating all large k-itemsets in lexicographic order at some underestimate of said user required support level until the available memory is fully utilized; and resetting said underestimated support level upward to a value defined by said f-quantile value; and pruning all k-itemsets whose associated support value is less than said underestimated support value; and continuing this process until a level of support is achieved that allows all generated k-itemsets to be stored with the available memory of the system.

12. The computer program device according to claim 10 wherein the step of generating large itemsets further includes generating large itemsets with a plurality of dimensions.

13. The computer program device according to claim 10 wherein the step of generating large itemsets further includes a hierarchical structure for said large itemsets.

14. The computer program device according to claim 10 wherein the step of generating large itemsets further includes both a plurality of dimensions and a hierarchical structure for said large itemsets.

15. The computer program device according to claim 9 where the step of generating large itemsets is based on the largest number of itemsets desired given available computer memory.

16. The computer program device according to claim 9, wherein the step of pre-storing adjacency information further includes the steps of:

storing all subsets of large itemsets; and storing pairs of large itemsets such that one itemset can be obtained from another by removing exactly one item.

* * * * *

UNITED STATES PATENT AND TRADEMARK OFFICE
CERTIFICATE OF CORRECTION

PATENT NO. : 5,920,855
DATED : July 6, 1999
INVENTOR(S) : Charu C. Aggarwal, et al.

It is certified that error appears in the above-identified patent and that said Letters Patent is hereby corrected as shown below:

On Title Page, section [56], under U.S. Patent Documents, line 3: "5,724,573" should read --5,774,573--

Column 4, line 29: "association 4;" should read --association rules/itemsets--

Signed and Sealed this

First Day of February, 2000

*Attest:*

*Attesting Officer*

Q. TODD DICKINSON

*Acting Commissioner of Patents and Trademarks*